July 11, 1944.  C. E. HAMANN  2,353,461
DRY PLATE RECTIFIER FOR PORTABLE RADIOS
Filed March 31, 1942
Fig. 1.
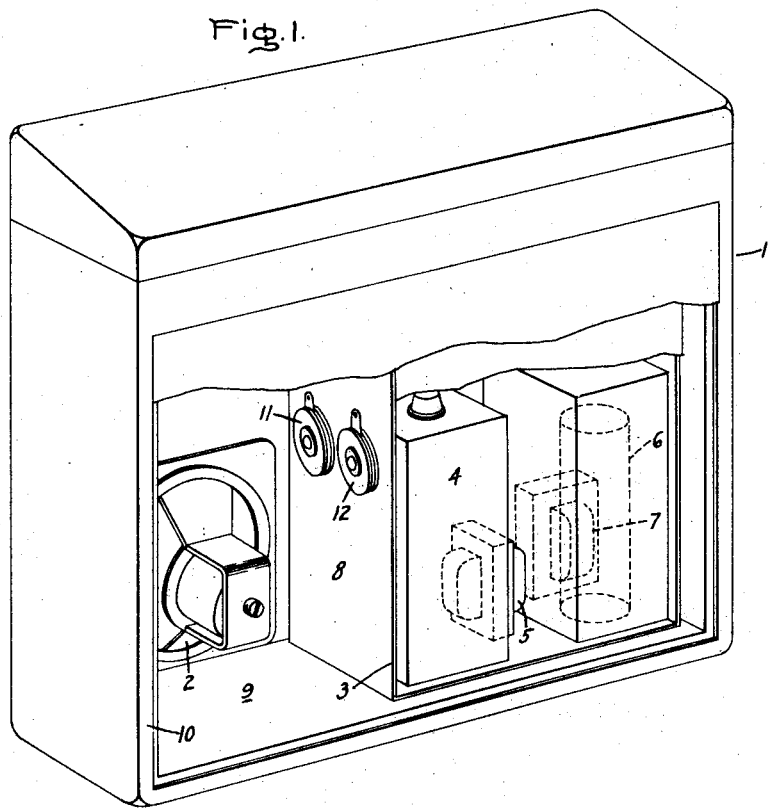
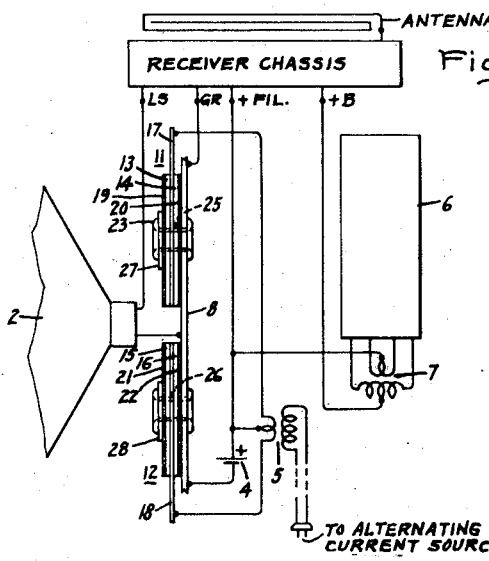
Fig. 2.
Inventor:
Charles E. Hamann,
by Harry E. Dunham
His Attorney.

Patented July 11, 1944

2,353,461

UNITED STATES PATENT OFFICE 2,353,461

DRY PLATE RECTIFIER FOR PORTABLE RADIOS

Charles E. Hamann, Stratford, Conn., assignor to General Electric Company, a corporation of New York Application March 31, 1942, Serial No. 436,932

6 Claims. (Cl. 175—366)

My invention relates to portable radio sets powered from a storage battery which is charged in the set from any available alternating current source through a dry plate rectifier included in the set.

The invention relates particularly to dry plate rectifiers for small-dimensioned, storage-battery-powered portable radio receivers of relatively large output, and it is the general object of the invention to provide an improved dry plate rectifier arrangement for radio receivers of this type.

In the manufacture of portable storage-battery-powered radio receivers required to be of small dimensions and at the same time to be capable of a relatively large output which in turn necessitates the provision of a relatively high capacity rectifier for charging of the battery and for operation of the receiver, difficulties have been encountered because the necessarily limited space available in the radio cabinet for dry plate rectifier equipment presents a serious obstacle to the employment of the usual dry plate rectifier assembly. Rectifiers of the conventional type, in order that permissible operating temperature shall not be exceeded, must have relatively large disk surface and ample mounting space. In particular such rectifiers must include radiating fins of large area to ensure adequate dissipation of the heat losses incident to rectifier operation.

In radio receivers of the storage-battery-operated portable type above mentioned, one or more metal containers are commonly included within which may be mounted various elements of the receiver. Such a metal mounting member or container having walls of relatively large area, may, for example, constitute a housing for the storage battery alone, or the metal container may constitute the housing for a power unit comprising the storage battery together with devices electrically associated therewith. It is a particular object of my invention to provide, for radio receivers of the type hereinabove described, a dry plate rectifier arrangement which is capable of relatively high power rating while meeting the rigorous manufacturing requirement of small mounting space in the cabinet for the added rectifier elements. In accordance with the present invention the foregoing objects are accomplished and the above noted difficulty is overcome by utilizing a portion or wall of a metal mounting member or container as a rectifier disk mounting means and, further, as a heat loss dissipating means for the dry plate rectifier assembly.

Preferably, in accordance with the present invention, a wall of the metal container above mentioned within which is mounted the storage battery alone, or the storage battery electrically associated with other devices, is utilized as the rectifier disk mounting means and heat dissipating means.

It is a further object of the present invention to simplify the construction and to reduce the size and cost of the dry plate rectifier employed in the storage-battery-powered portable receiver. To aid further in accomplishing this object, in accordance with the present invention a rectifier arrangement is provided such that the complete rectifier assembly comprises rectifier disks having semi-conductive or active surfaces directly electrically associated with the disk supporting wall of the metal container, the wall itself functioning as a rectifier base or carrier plate and thus being a constituent part not only mechanically but also electrically of the dry plate rectifier assembly.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawing in which Fig. 1 is a perspective view of a portable radio receiver in which a dry plate rectifier in accordance with my invention has been embodied, and Fig. 2 is a simplified circuit diagram of the receiver shown in Fig. 1.

Referring to the drawing, and particularly to Fig. 1, in the portable radio receiver shown therein the numeral 1 designates the cabinet of the radio receiver which provides in its upper portion space for a usual chassis comprising electron discharge devices and related devices of amplifier and like stages and a suitable antenna. As the chassis elements form no part of my present invention they will not be described in detail herein. In the cabinet are mounted a loudspeaker 2, a metal container 3, a storage battery 4 housed within the metal container, a transformer 5 adapted to be connected to an outside source for the charging of the battery through the rectifier to be hereinafter described, a vibrator device 6, and a transformer 7 operatively associated with the vibrator to constitute therewith a converter device or vibrator-inverter for supplying energy to the receiver stages from the battery.

Preferably the metal container 3 houses not only the battery 4 but also the transformer 5 and the vibrator-inverter constituted by vibrator 6 and transformer 7. The metal container thus occupies a relatively large proportion of the cabinet space in order to house the power unit comprising the battery 4 and the devices 5 to 7 electrically associated therewith, and the wall areas of the container are of considerable extent.

For space and weight reasons and for convenience in providing tuning and other control of the receiver the loudspeaker 2 and the metal container 3 are disposed longitudinally in the lower portion of the cabinet. With this disposition of the loudspeaker 2 and container 3 in the cabinet, one end wall, 8, of the container 3 faces an air space 9 of considerable volume, since, because of the cone-shaped general configuration of the loudspeaker, the latter does not fill the space between the container 3 and the outer wall 10 of the cabinet.

In accordance with the present invention, in order to provide a dry plate rectifier capable of supplying current at the high rate required in the radio receiver of relatively large output without exceeding permissible temperature rise of the rectifier active elements, and at the same time without the increase in the dimensions of cabinet 1 which would be necessary if space were to be provided sufficient for the mounting therein of a dry plate rectifier of the conventional type having sufficient disk area and equipped with the requisite large cooling fins, the wall 8 of the metal container 3 is utilized as a mounting means for a group or groups of rectifier elements, as 11 and 12, shown in detail in Fig. 2.

Referring to Fig. 2, as shown in the diagrammatic illustration therein of circuit arrangements of the radio receiver embodying the present invention, in the complete assembly of the dry plate rectifier, which is illustrated herein as of the copper oxide type but may be of any suitable type, the two groups 11 and 12 are arranged for usual full-wave rectification. Each group preferably comprises two disks, 13 and 14 of group 11, and 15 and 16 of group 12, in parallel. The metal surfaces of the disks of each group are connected together through terminal members, 17 of group 11 and 18 of group 12, mounted between the pairs of disks. The semi-conductor layers or copper oxide active layers 19, 20 of group 11 and 21, 22 of group 12 are connected together by rivets 23 and 24 respectively, which secure the groups 11 and 12 to the metal wall 8. For better conductivity the oxide active layers 19 to 22 have a usual thin film of nickel or silver or the like plated or coated thereon. The rivets 23 and 24 are insulated from the metal portions of the copper disks and from the terminal members 17 and 18 by insulation sleeves 25 and 26.

Metal washers 27 and 28 are mounted in contact with the plated oxide layers 19 of group 11 and 21 of group 12. The outer ends of the rivets are in electrical contact with the plated oxide layers 19 and 21 through the washers 27 and 28. The inner ends of the rivets are in electrical contact with the wall 8, and the wall itself is in electrical contact with the plated oxide layers 20 and 22 of the disks 14 and 16. The wall 8 which may be of steel or other suitable metal thus constitutes a base plate or carrier plate for the group of rectifier elements 11 and 12, and the complete dry plate rectifier assembly includes the wall 8, the added elements being only the groups 11 and 12.

In operation of the portable receiver, battery 4 is charged from the outside alternating current source through the full-wave rectifier system comprising the dry plate elements and the transformer 5. The battery, either when connected to or disconnected from the alternating current source, supplies cathode heater current directly to the receiver stages and suitable anode and screen grid potential thereto through the vibrator-inverter comprising vibrator 6 and transformer 7.

In a practical radio receiver of the portable type embodying the present invention the radio cabinet was substantially 13 inches in height and width and four and three-fourths inches in depth and the total weight 16 pounds. The battery was of two volt and 20 ampere hour capacity. The loudspeaker cone was five inches in diameter. The receiver power consumption was two and three quarter watts, or one and three-tenths ampere at two and one-tenth volts, and the maximum electrical output approximately 225 milliwatts. The battery was charged at the rate of approximately one and thirty-five hundredths of an ampere during non-operation periods of the receiver.

To provide in the above described practical receiver the dry plate rectifier capacity sufficient to supply with a large safety factor the relatively large current at two volts for charging the battery when disconnected from the receiver stages or to supply the current for operating the receiver while simultaneously charging the battery at a low rate, the added rectifier elements 11 and 12 comprised only four usual one and one-half inch diameter disks, the total active area of the disks being no greater than that of an equivalent dry plate rectifier of the conventional type, even at twice the rating of the latter rectifier which further was required to be provided with the usual large area radiating fins. The rectifier of conventional type would have necessitated, if employed, a prohibitively large mounting space to be added to the space within the radio cabinet.

The provision of the dry plate rectifier arrangement in accordance with my present invention for portable radio receivers thus calls for no mounting space in addition to that allotted within the cabinet for the mounting of the chassis, power unit, loudspeaker and other usual elements, and therefore, in the receiver incorporating the dry plate rectifier in accordance with my invention, the dimensions of the cabinet remain within the relatively restricted limits imposed by other elements of the design than the rectifier. Further because of the utilizing of a container wall such as 8 as a base or carrier plate of the rectifier and as a highly efficient heat loss dissipating means thus eliminating the necessity for radiating fins, the rectifier assembly comprises fewer added parts and is of substantially reduced weight and cost.

My invention has been described herein in a particular embodiment for purposes of illustration. It will be understood, however, that the invention is susceptible of various changes and modifications and that by the appended claims I intend to cover any such modifications as fall within the true spirit and scope of my invention.

What I claim as new and desire to secure by Letters Patent of the United States is:

1. In a radio apparatus and the like, a dry plate rectifier adapted to be connected to an alternating current source to supply direct current to said apparatus, a metal container for housing devices of said apparatus, said rectifier including a wall of said container and at least one rectifier element supported by and in thermal contact with said wall whereby said wall dissipates heat losses of said rectifier and said wall becomes part of the rectifier circuit and is maintained at the same potential as said rectifier element.

2. In a radio apparatus and the like including a storage battery for supplying current thereto, a metal container for housing said battery, and a dry plate rectifier for charging said battery including a wall of said container and at least one rectifier element mounted on and in thermal contact with said wall whereby heat losses of said rectifier are dissipated by said wall and said wall becomes part of the rectifier circuit and is maintained at the same potential as said rectifier element.

3. In a radio apparatus and the like, a dry plate rectifier adapted to be connected to an alternating current source to supply direct current to said apparatus, a metal container for housing devices of said apparatus, said rectifier including a rectifier disk supported by a wall of said container and having a semiconductor layer in direct electrical contact with said wall.

4. In a radio apparatus and the like including a storage battery for supplying current thereto, a metal container for housing said battery, and a dry plate rectifier for charging said battery including a wall of said container and a rectifier element supported on said wall and having a semi-conductor layer in direct electrical contact therewith.

5. In a radio apparatus and the like, a dry plate rectifier adapted to be connected to an alternating current source to supply direct current to said apparatus, a metal container for housing devices of said apparatus electrically associated with said rectifier, said rectifier including a rectifier element supported on a wall of said container and having a semi-conductor layer in electrical contact with said wall whereby said wall constitutes a carrier plate element and a heat loss dissipating element for said rectifier.

6. In a radio apparatus and the like including a storage battery, a metal container for housing said battery and devices electrically associated therewith, and a dry plate rectifier for charging said battery including a rectifier disk supported on and in thermal contact with a wall of said container and having a semi-conductor layer in electrical contact with said wall whereby said wall conducts current to said semi-conductor layer and dissipates heat losses of said rectifier.

CHARLES E. HAMANN.